United States Patent Office 3,414,379
Patented Dec. 3, 1968

3,414,379
MANUFACTURE OF TITANIUM DIOXIDE
Raymond J. Wigginton, Grimsby, William N. Dear, Theydon Bois, and William R. Culfeather, Cleethorpes, England, assignors to Laporte Titanium Limited, London, England, a British company
Filed June 1, 1965, Ser. No. 459,995
Claims priority, application Great Britain, June 3, 1964, 23,043/64
9 Claims. (Cl. 23—202)

ABSTRACT OF THE DISCLOSURE

A process and apparatus for the production of titanium dioxide by the vapor phase oxidation of titanium tetrachloride. Separate streams of titanium tetrachloride and an oxidizing gas are separately preheated and introduced into a reaction zone where they react to form finely divided titanium dioxide. At least a portion of the oxidizing gas is preheated by admixing at least a portion of the oxidizing gas with a fuel gas to provide a combustible gaseous mixture, igniting the combustible mixture to form a flame and passing the flame through a distributed electrical discharge whereby the gaseous mixture is heated to a temperature within the range of from about 2,500° C. to about 3,500° C. All of the oxidizing gas introduced into the reaction zone may be preheated by admixture with the fuel gas and passage through the distributed electrical discharge, or only a portion of the oxidizing gas may be so preheated. The portion of the oxidizing gas which is preheated by passage through a distributed electrical discharge may be preheated by one such discharge or by passage through a plurality of such distributed electrical discharges.

---

The present invention relates to the manufacture of titanium dioxide by the vapor phase oxidation of titanium tetrachloride.

More particularly, the invention relates to a process for the manufacture of titanium dioxide in which the vaporous titanium tetrachloride and oxidizing gas are separately preheated. Thereafter, the preheated titanium tetrachloride vapor and the preheated oxidizing gas are introduced through separate inlet means into a generally tubular reaction chamber in such manner whereby there is produced a turbulent stream of intimately mixed gases which flow along the length of the reaction chamber at a flow rate corresponding to a Reynold's flow number of at least about 10,000 and wherein the titanium dioxide is formed in finely divided form. An inert particulate refractory material may be introduced into the reaction chamber in such manner that it impinges upon the reactor surface or surfaces that are immediately adjacent to the gas inlet means and accessible to the reactants whereby to prevent or substantially minimize the deposition of product titanium dioxide on the said surface or surfaces. Substantially all of the said particulate material is carried out of the reaction chamber in suspension in the turbulent gas stream and is thereafter separated from the product titanium dioxide.

The titanium tetrachloride is preheated to a temperature within the range of from about 200° C. to 400° C. by heat exchange with a heated metal surface. At least a part of the oxidizing gas is preheated to a temperature within the range of from about 2,500° C. to 3,500° C. by producing a strongly turbulent stream of a combustible mixture comprising the oxidizing gas and a fuel gas, igniting the combustible mixture to form a flame, establishing a distributed electrical discharge across the flame, and passing substantially all of the resulting gaseous mixture through the discharge to substantially raise its temperature.

The degree of preheat of the titanium tetrachloride vapor, the oxidizing gas and any other oxidizing gas introduced into the reaction chamber is such that, if no reaction were to take place between the titanium tetrachloride and the oxidizing gas, the temperature of the gaseous mixture within the reaction chamber would be at least 700° C.

The invention also provides suitable forms of apparatus in which to practice the process hereindescribed.

The term "distributed electrical discharge" as used in the present specification and appended claims means a relatively high voltage, low current discharge in which the current density is more or less uniform over a relatively large cross-sectional area; as contrasted with an electric arc discharge, which is a low voltage, high current discharge confined within narrow filaments extending between two electrodes.

In a quiescent gas, at normal temperature and pressure, a distributed electrical discharge is not stable and the discharge takes the form of a low voltage arc. Stability can be achieved, however, by reducing the pressure sufficiently. In accordance with the present invention, the conditions prevailing within the flame tend to promote stability in a number of ways. First, the elevated temperature within the flame leads to a low density and a correspondingly high rate of diffusion whereby differences in ionization density rapidly disappear. Secondly, because the gas temperature is already relatively high, further changes in temperature have only a relatively small effect on the density. Third, because the combustion process itself leads to the formation of some ions, small changes in the current density tend not to have a large concentrating effect on the discharge. Fourth, the strong turbulence in the flame tends to lead to an even distribution of temperature and ionization density. Fifth, because the gas is flowing through the region of the discharge, any particular volume of gas is only exposed to the discharge for a short time.

As a further precaution against arcing, a ballast resistor and an element having inductance may be placed in series with the discharge electrodes.

If the volt-ampere characteristic of the discharge is found to be unduly unsensitive to variations in the temperature of the gas within the discharge, very small quantities of salts of metals having low ionization potentials may be added. Such salts undergo thermal ionization and provide a relatively constant background ionization which reduces the sensitivity of the volt-ampere characteristic to temperature variations. The concentration of such added salts must be carefully controlled, however, because the presence of a high concentration limits the maximum temperature that can be reached before the onset of a discharge of the heavy-current type. The optimum concentration, which can readily be found by experiment, depends upon the degree of thermal ionization that occurs in the flame in the absence of such metal salts and upon the ion-electron concentration required for the establishment of a distributed electrical discharge. Both these quantities depend upon the temperature and the chemical composition of the flame. Thus, for example, the combustion products of a normal hydrocarbon/air flame contain approximately $10^{10}$ to $10^{11}$ ion-electrons per cc. while the combustion products of a carbon monoxide/air or oxygen flame contain a lower concentration of ion-electron pairs, the actual concentration increasing with an increase in the moisture content of the gases. In a hydrocarbon/air flame at normal temperatures the minimum concentration of ion-electrons required for a distributed electrical discharge to occur is approximately $10^{12}$ to $10^{13}$ per cc. A concentration of approximately $10^{15}$ ion-electrons per cc. represents a reasonable minimum value when using natural gas or carbon monoxide as the fuel gas and air or oxygen as the oxidizing gas. A satisfactory working range will usually be found to be from $10^{15}$ to $10^{16}$ ion-electrons per cc. Therefore, the quality of metal salts to be added usually should be sufficient to provide at least 90% of the required concentration of ion-electrons. Alkali metal salts and alkaline earth metal salts are suitable for this purpose.

Either a part or all of the oxidizing gas may be preheated by means of a distributed electrical discharge and, when only a part of the oxidizing gas is so preheated, the remaining part preferably is preheated to a temperature within the range of from about 600° C. to 1,000° C. by heat exchange with a heated metal surface.

The portions of the oxidizing gas which is preheated by means of a distributed electrical discharge may be preheated, in part, by one such discharge and, in part, by another such discharge. Thus, a combustible mixture comprising the fuel gas and a part only of the oxidizing gas may be ignited to form a flame and passed through a first electrical discharge to raise the temperature of the mixture and thereafter the remainder of the oxidizing gas may be incorporated with said mixture and the resulting second gaseous mixture may then be passed through a second distributed electrical discharge to raise the temperature of the flowing gases even higher. The remainder of the oxidizing gas may or may not be preheated by heat exchange with a heated metal surface prior to its incorporation with the heated gaseous mixture. The temperature of the gaseous mixture entering the second distributed electrical discharge must, however, be sufficiently high to ensure that the ion-electron concentration within that discharge is sufficiently high for substantial heating of the gaseous mixture to take place therein. The magnitude of the threshold temperature will depend upon the chemical composition of the gaseous mixture, being reduced, for example, by the presence of salts of metals having a low ionization potential.

In general, the distributed electrical discharge is established between a tubular electrode, through which the combustion gas flows and an electrode in the form of a probe that is coaxial with the tubular electrode. The downstream end of the probe is preferably located upstream of the upstream end of the tubular electrode. If desired, however, the distributed electrical discharge may be established between two tubular electrodes that are spaced apart from one another in an axial direction and through which the combustion gases pass in turn. When two distributed electrical discharges are established, the first may be between a tubular electrode and an electrode in the form of a probe mounted coaxially with the tubular electrode, and the second may be between two axially separated tubular electrodes. The electrodes are advantageously made of copper and are preferably cooled by a suitable fluid. The tubular member through which the combustion gas flows preferably is, at least in the region of the distributed electrical discharge, constructed of or liner with a refractory material.

The combustible mixture is advantageously ignited, preferably by a spark plug, at a point upstream of the downstream end of the upstream electrode.

The fuel gas is preferably natural gas or carbon monoxide.

The oxidizing gas preferably comprises molecular oxygen and may consist of substantially pure oxygen or of oxygen in admixture with an inert gas or gases, for example, air or oxygen-enriched air or ozone. The total amount of oxidizing gas introduced into the reaction chamber in excess of that required to react stoichiometrically with all of the fuel gas and with any additives such as, for example, aluminum chloride (which may, as hereinafter described, be introduced into the reaction chamber) may be within the range of ±10%, preferably, ±5%, of that required to react stoichiometrically with the titanium tetrachloride.

The inert refractory particulate material preferably is sand and it preferably is introduced into the reaction chamber in suspension in an oxidizing gas which either has not been preheated or has been preheated by heat exchange with a heated metal surface. Generally, it should not be introduced in suspension in oxidizing gas that has been preheated by combustion with a fuel gas and the action of a distributed electrical discharge as hereindescribed.

If desired, a barrier gas may be introduced into the reaction chamber as a further precaution to prevent or minimize the deposition of product oxide on the reactor surfaces.

Water vapor and various conditioners and other agents may be introduced into the reacting chamber, as desired.

It is important that the design of the reaction chamber, the temperatures and the flow rates of the reactants be such that the reactants and the products of the reaction remain within the oxidation zone for a period that is long enough to ensure substantially complete reaction, but not so long as to cause undesirable particle growth of the product titanium dioxide. After gaseous reaction products with the product oxide suspended therein leave the oxidation zone, they should be subjected to a quick cooling or quenching treatment to reduce the temperature to below 900° C. and preferably below 650° C. Thereafter, the product titanium dioxide can be separated from the inert refractory particulate material in any convenient manner.

For a more complete understanding of the present invention, reference is made to the following detailed description of the process and apparatus thereof taken in conjunction with the accompanying drawing in which.

Figure 1:
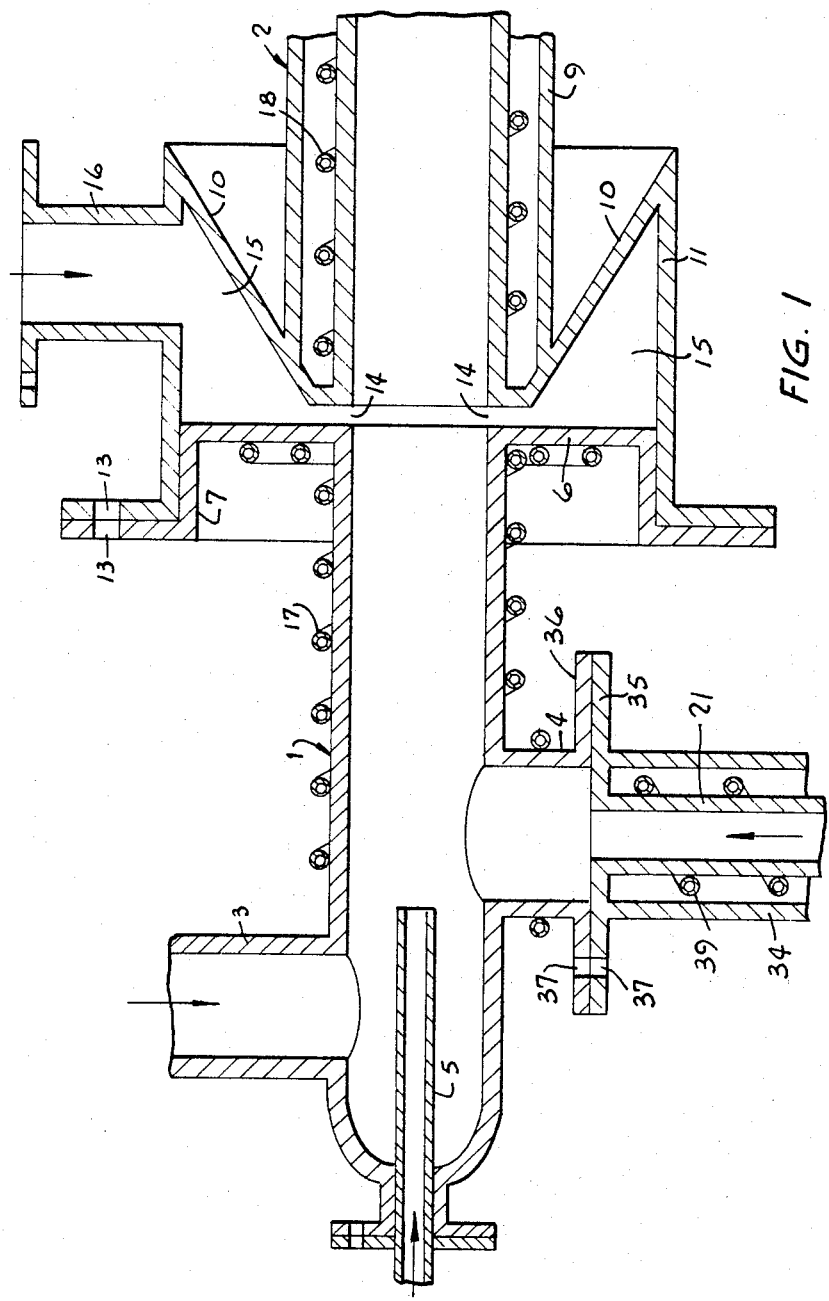
FIG. 1 is a view in cross-section illustrating the upstream end portion of a reaction chamber.
Figure 2:
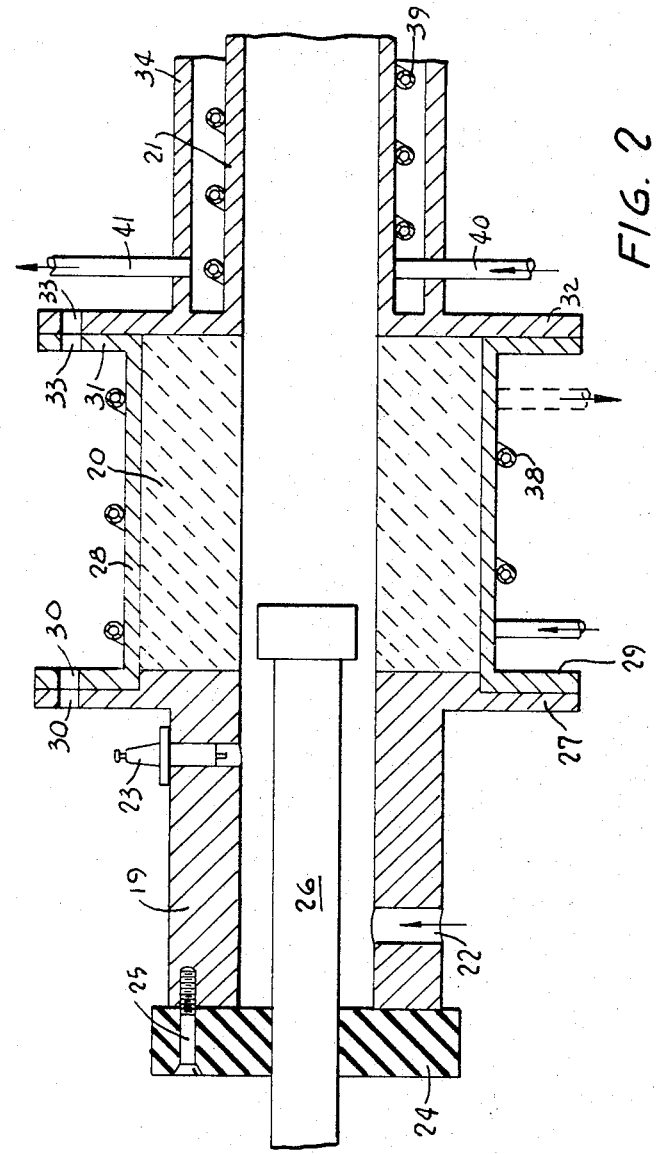
FIG. 2 is a view in cross-section illustrating one form of oxidizing gas preheater for use with the reaction chamber shown in FIG. 1.

Referring to FIG. 1 of the drawing, there is illustrated a generally tubular metallic reaction chamber made up of an upstream part, indicated generally by reference numeral 1, and a downstream part, indicated generally by reference numeral 2. A supply pipe 3 for oxidizing gas leads into the upstream part 1 of the reaction chamber from a preheater, not shown. Pipe 3 comprises an externally heated metal tube adapted to carry the oxidizing gas. A short distance downstream of the supply pipe 3, a second supply pipe 4 for oxidizing gas leads into the upstream part 1 of the reaction chamber from an electric discharge preheater which is shown in FIG. 2 and described hereinafter.

At its upstream end, part 1 of the reaction chamber terminates in a neck through which a nozzle 5 enters the reaction chamber coaxially for the introduction of scouring inert refractory particles in suspension in a carrier gas.

At its downstream end, part 1 of the reaction chamber terminates in an outwardly extending annular flange 6 from the outer edge of which a cylindrical flange 7 extends in an upstream direction to terminate in an outwardly extending annular flange 8.

The downstream part 2 of the reaction chamber is provided with coaxial cooling jacket 9. At its upstream end, a frusto-conical flange 10 extends outwardly from part 2 in a downstream direction and terminates in a cylindrical flange 11, the upstream end of which fits over the cylindrical flange 8. The cylindrical flange 11 terminates at its upstream end in an outwardly extending annular flange 12. The annular flanges 8 and 12 each are formed with registering apertures 13 through which bolts (not shown) are inserted to secure the upstream part 1 of the reaction chamber and the downstream part 2 of the reaction chamber together.

The upstream end of the downstream part 2 of the reaction chamber is separated from the downstream end of the upstream part 1 by a narrow gap which forms a circumferential slot 14 that provides communication between the interior of the reaction chamber and the annular chamber 15 defined by the annular flange 6, the frustoconical flange 10 and the cylindrical flange 11. A supply pipe 16 of titanium tetrachloride vapor leads into the annular chamber 15 from a preheater, not shown. Pipe 16 comprises a metal tube provided with means for heating it externally.

The upstream part 1 and downstream part 2 of the reaction chamber are provided with pipes 17 and 18, respectively, each adapted to carry a cooling fluid. One end of the pipe 18 is open and, after passing through the pipe 18, cooling fluid enters the space between the inner portion of the downstream part 2 and the cooling jacket 9, flows along that space and leaves through an outlet (not shown) at the downstream end thereof.

Referring to FIG. 2 of the drawings, there is illustrated an electric discharge preheater for the oxidizing gas which comprises three coaxial tubular portions arranged end to end and indicated generally by the reference numerals 19, 20 and 21.

The tubular portion 19 is provided towards its upstream end (with respect to the direction of flow of oxidizing gas through this preheater) with an inlet 22 for a mixture of oxidizing gas and a fuel gas and, toward its downstream end, with an opening into which there is screwed a spark plug 23. The upstream end of the tubular portion 19 is closed by a cylinder 24 of electrically insulating material which is secured to the tubular portion 19 by means of screws 25. Cylinder 24 is provided with a central aperture adapted to receive a water-cooled copper electrode 26.

At its downstream end, the tubular portion 19 terminates in an outwardly extending annular flange 27, the outer part of which is of reduced thickness to form a shoulder. The upstream end portion of a tubular member 28 is provided with an outwardly extending annular flange 29 which fits onto the shoulder of flange 27. The flanges 27 and 28 are secured together by bolts (not shown), which pass through registering apertures 30. At its downstream end, tubular member 28 terminates in an outwardly extending annular flange 31. The upstream end of the tubular portion 21 is provided with an outwardly extending annular flange 32. Flanges 31 and 32 are secured together by means of bolts (not shown) which pass through registering apertures 33.

The tubular portion 20 is made of a non-metallic refractory material and is positioned between flanges 29 and 31 and the tubular member 28.

The metallic tubular portion 21 is provided with a jacket 34 and terminates at its downstream end in an outwardly extending annular flange 35 (see FIG. 1) which abuts a corresponding flange 36 formed at the outer end of supply pipe 4. Flanges 35 and 36 are secured together by bolts (not shown) which pass through registering apertures 37.

A tube 38, through which cooling fluid can be passed, is secured about the tubular member 28. A similar tube 39 is secured about the tubular portion 21. One end of tube 39 is open whereby cooling fluid may flow in turn through an inlet tube 40, the tube 39, the space between the tubular portion 21 and the packet 34, and then through an outlet tube 41.

This form of apparatus operates in the following manner. Preheated titanium tetrachloride vapor is supplied to the annular chamber 15 through the supply pipe 16 and enters the reaction chamber through the circumferential slot 14. Preheated oxidizing gas is supplied to the reaction chamber through the supply pipe 3. Inert refractory particles are blown into the reaction chamber through the nozzle 5 by means of a compressed gas. The particles emerge from the nozzle 5 in the form of a spray which impinges on the portions of the walls of the reaction chamber that are adjacent to the titanium tetrachloride inlet 14 and at points downstream thereof. A mixture of oxidizing gas and a fuel gas are introduced into the electrical discharge preheater through its inlet 22 and then ignited by the spark plugs 23. The resulting flame passes through a high voltage, low current, distributed electrical discharge formed between the electrode 26, to which a high voltage is applied, and the tubular portion 21 which, together with the metal reaction chamber, is grounded. This raises the gaseous mixture to a very high temperature before it enters the reaction chamber through the pipe 4. Thus, a highly turbulent stream of hot gases passes along the reaction chamber with rapid mixing taking place in the region of the titanium tetrachloride inlet 14. Titanium dioxide is produced in finely divided form and is carried out of the reaction chamber in suspension in the gas stream.

Figure 3:
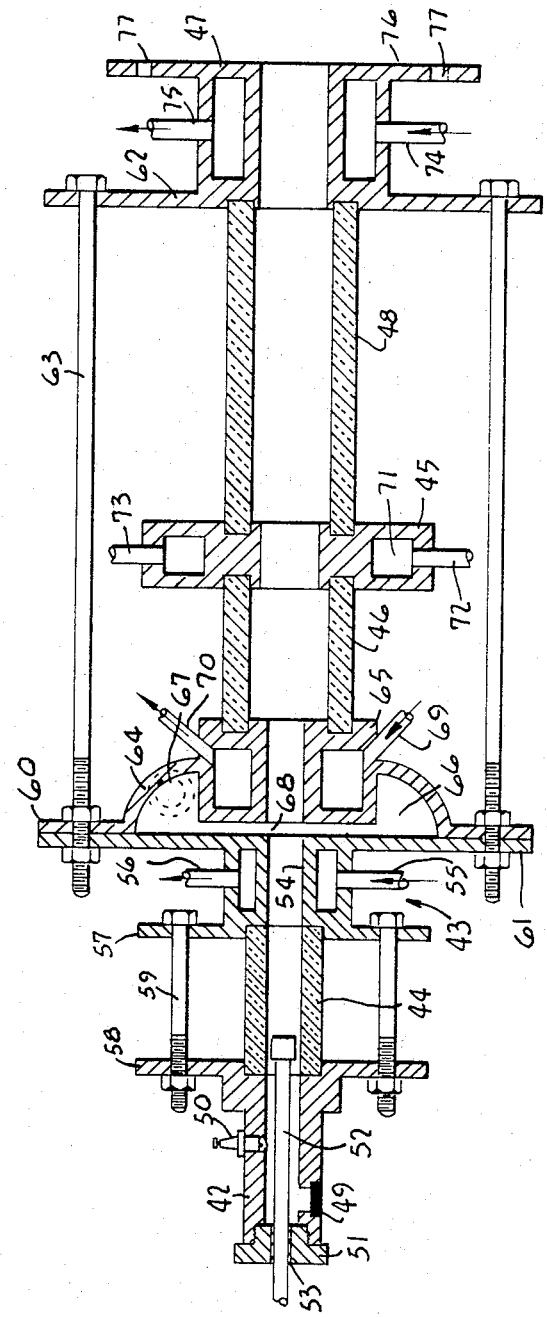
FIG. 3 is a view in cross-section illustrating a second form of oxidizing gas preheater for use with the reaction chamber shown in FIG. 1.

The second form of apparatus, illustrated in FIG. 3, differs from the form shown in FIGS. 1 and 2 principally in the construction of the electrical discharge preheater.

The electrical discharge preheater shown in FIG. 3 comprises, beginning at its upstream end with respect to the direction of flow of gas through the preheater, a nickel tubular member 42, a nickel electrode and oxidizing gas inlet assembly, indicated generally by reference numeral 43 and spaced from the tubular member 42 by a ceramic electrically insulating tube 44, a copper electrode 45 spaced from the assembly 43 by a ceramic electrically insulating tube 46, and a tubular member 47 at the downstream end of the preheater and separated from the copper electrode 45 by a ceramic electrically insulating tube 48.

The tubular member 42 is formed, toward its upstream an inlet 55 and an outlet 56 to allow cooling water to oxidizing gas and a fuel gas and, toward its downstream end, with an opening adapted to receive a spark plug 50. The upstream end of the member 42 is closed by a plug 51 provided with a central aperture adapted to receive a water-cooled copper electrode 52, the aperture being fitted with an electrically insulating sleeve 53.

The assembly 43 is made in two parts, the upstream part being a double-walled tubular member 54 having an inlet 55 and an outlet 56 to allow cooling water to be passed between its walls. At its upstream end, the member 54 is formed with an outwardly extending annular flange 57 which is secured to a corresponding flange 58 formed at the downstream end of the tubular member 42 by means of retaining bolts 59 (of which only one is shown).

The ceramic tube 44 is located between the tubular member 42 and the member 54. These members are provided with recesses whereby ceramic tube 44 is positively held in position.

The downstream part of the assembly 43 comprises an annular flange 60 secured to an outwardly extending annular flange 61 formed at the downstream end of the tubular member 54 and to a corresponding flange 62 formed at the upstream end of the tubular member 47 by means of retaining bolts 63 (of which only one is shown). From the inner edge of the annular flange 60, a curved flange 64 leads inwardly to join the outer wall of a double-walled tubular member 65.

The flanges 61 and 64 and the tubular member 65 together define an annular chamber 66 into which further oxidizing gas can be admitted through an inlet 67. The tubular member 65 is separated from the tubular member 54 by a narrow space or circumferential slot 68 through which the further oxidizing gas can enter the preheater.

Cooling fluid can be introduced into the region between the walls of the tubular member 65 through an inlet pipe 69 and withdrawn through an outlet pipe 70.

The electrode 45 is formed with an annular passage 71 into which cooling fluid can be introduced through an inlet pipe 72 and from which it can be withdrawn through an outlet pipe 73. Similarly, the tubular member 47 is double-walled and cooling fluid can be introduced into the region between the walls through an inlet pipe 74 and withdrawn through an outlet pipe 75.

The tubular member 65 and the electrode 45 are suitably recessed to receive the end portions of the ceramic tube 46 and, similarly, the electrode 45 and the tubular member 47 are suitably recessed to receive the end portions of ceramic tube 48.

At its downstream end, the tubular member 47 is formed with an outwardly extending annular flange 76 provided with apertures 77 adapted to register with the aperture 37 (see FIG. 1) in the flange 36 whereby flanges 36 and 76 can be secured together by bolts (not shown).

The manner of operation of this form of apparatus is the same as that of the first form except that additional oxidizing gas is introduced through the inlet 67 and that two distributed electrical discharges are provided, one between the electrode 52 and the assembly 43, which is grounded, and the other between the electrode 45 and the assembly 43.

The following examples are set forth to further illustrate, not limit, the present invention.

EXAMPLE I

Titanium dioxide was produced by the vapor phase oxidation of titanium tetrachloride using the apparatus illustrated in FIGS. 1 and 2 of the drawing.

A mixture of carbon monoxide and oxygen was fed at ambient temperature to the inlet 22, the rate of feed of carbon monoxide being about 600 cubic feet per hour (measured at N.T.P.) and the rate of feed of oxygen being about 1,300 cubic feet per hour. A stream of nitrogen that had been passed through a bath of molten potassium chloride maintained at a temperature of about 900° C. was also supplied to the inlet 22, and in this way potassium chloride was introduced into the electrical discharge preheater at a rate of about 20 grams per hour.

The mixture of carbon monoxide and oxygen was ignited by the spark plug 23 and a distributed electrical discharge was established across the resulting flame by energizing the electrode 26 from a 4 kv., 150 kva. transformer. The discharge raised the temperature of the gaseous mixture to approximately 3,000° C. The hot mixture then entered the reaction chamber through the pipe 4.

Oxygen which had been preheated to a temperature of 900° C. in a suitable preheater was fed to the reaction chamber through a supply pipe 3 at a rate of about 2,300 cubic feet per hour. This oxygen contained water vapor, which was introduced into the reaction chamber at a rate of about 8 pounds per hour.

Silica sand having a particle size within the range of from about −20 to +30 mesh (B.S.S.) was blown into the reaction chamber through the nozzle 5 at a rate of about 150 pounds per hour by means of compressed oxygen. The compressed oxygen was at room temperature and was introduced at a rate of about 260 cubic feet per hour (measured at N.T.P.).

The temperature of the oxidizing gas stream approaching the titanium tetrachloride inlet 14 was approximately 2,000° C.

Titanium tetrachloride vapor, which had been preheated in a metal preheater to a temperature of only about 350° C. was supplied to the annular chamber 15 at a rate of about 1,500 pounds per hour through the supply pipe 16 and entered the reaction chamber through the circumferential slot 14. The titanium tetrachloride vapor had incorporated with it aluminum chloride vapor which was supplied at a rate of about 35 pounds per hour. It was calculated that, had no reaction occurred, the temperature of the gaseous mixture in the region of the titanium tetrachloride inlet 14 would have been approximately 940° C. In fact, instantaneous ignition occurred and the titanium tetrachloride burned with a steady flame to give titanium dioxide pigment with a rutile content of 99% and a tinting strength of 1750 (Reynold's scale). It had a mean particle size of 0.23 micron.

EXAMPLE II

Titanium dioxide was produced by the vapor phase oxidation of titanium tetrachloride using the apparatus illustrated in FIGS. 2 and 3 of the drawing.

A mixture of natural gas and oxygen was fed to the inlet 49, the rate of feed of the natural gas being about 300 cubic feet per hour (measured at N.T.P.) and the rate of feed of oxygen being about 900 cubic feet per hour (measured at N.T.P.). This gaseous mixture also contained potassium chloride vapor, which was fed at a rate of about 20 grams per hour. The mixture was ignited by the spark plug 50. A distributed electrical discharge was established across the resulting flame by energizing the electrode 52 from one side of a 4 kv. center-tapped (4 kv.–0–4 kv.) 150 kva. transformer. The discharge raised the temperature of the gaseous mixture to approximately 3,000° C.

Oxygen at ambient temperature was fed to the electrical discharge preheater through the inlet 67 at a rate of about 2,700 cubic feet per hour (measured at N.T.P.). The oxygen mixed rapidly with the hot gaseous mixture and reduced the temperature of the resultant gas stream within the preheater to approximately 1,900° C. A second distributed electrical discharge was established across the gas stream by energizing the electrode 45 using the other 4 kv. output of the transformer to raise the temperature of the flowing gas stream to about 2,500° C. This gas stream then was introduced into the reaction chamber through pipe 4.

Silica sand having a particle size within the range of from about −20 to +30 mesh (B.S.S.) was blown into the reaction chamber through the nozzle 5 at a rate of about 150 pounds per hour by means of compressed oxygen. The compressed oxygen was at room temperature and was introduced at a rate of 260 cubic feet per hour (measured at N.T.P.).

Titanium tetrachloride vapor, which had been preheated to a temperature of only about 350° C. using a metal preheater, was introduced into the reaction chamber through the inlet 14 at a rate of about 1,500 pounds per hour. The supply pipe 3 was shut off. Titanium dioxide of pigmentary quality was produced, the mean particle diameter being 0.27 micron.

While the invention has been described with respect to what at present are believed to be preferred embodiments thereof, it will be understood, of course, that certain changes, modifications, and the like may be made therein without departing from its true scope.

What is claimed is:

1. In a process for the production of titanium dioxide by reacting titanium tetrachloride with an oxidizing gas in the vapor phase which comprises preheating vaporous titanium tetrachloride, separately preheating an oxidizing gas and separately introducing the thus separately preheated gases into a reaction zone to produce a turbulent stream of intimately mixed gases having a temperature such that, if no reaction were to take place between the titanium tetrachloride and the oxidizing gas, the temperature of said mixed gases in said reaction zone would be at least about 700° C. which flow through said zone at a rate corresponding to a Reynold's flow number of at least about 10,000 to form finely divided titanium dioxide, the improvements which comprise preheating said vaporous titanium tetrachloride to a temperature within the range of from about 200° C. to 400° C., and preheating at least a portion of said oxidizing gas to a temperature within the range of from about 2,500°

C. to 3,500° C. by admixing a fuel gas and said portion of said oxidizing gas to provide a combustible gaseous mixture, igniting said combustible mixture to form a flame, establishing a distributed electrical discharge and passing said flame through said distributed electrical discharge whereby the temperature of said gaseous mixture is increased to a temperature within the range of from about 2,500° C. to 3,500° C.

2. A process as defined in claim 1 in which substantially all of the oxidizing gas introduced into the reaction zone is admixed with said fuel gas and passed through said distributed electrical discharge.

3. A process as defined in claim 1 in which only a portion of the oxidizing gas introduced into said reaction zone is admixed with said fuel gas and passed through said distributed electrical discharge and the remainder of said oxidizing gas is introduced into said reaction zone at a temperature within the range of from about 600° C. to 1,000° C.

4. A process as defined in claim 1 in which a portion of the oxidizing gas introduced into said reaction zone is admixed with said fuel gas and passed through a first distributed electrical discharge and thereafter the remainder of the oxidizing gas is incorporated in said admixture to provide a second gaseous mixture which is passed through a second distributed electrical discharge.

5. A process as defined in claim 4 in which the said remainder of the oxidizing gas is preheated prior to its incorporation in said admixture.

6. A process as defined in claim 1 in which the salt of a metal having a low ionization potential is incorporated in said combustible mixture.

7. A process as defined in claim 1 in which an inert refractory material is introduced into said reaction zone to prevent deposition therein of titanium dioxide.

8. A process as defined in claim 1 in which water vapor and aluminum chloride are incorporated with the reactants in the reaction zone.

9. A process as defined in claim 1 in which said fuel gas is selected from the group consisting of natural gas and carbon monoxide.

References Cited

UNITED STATES PATENTS

| | | | |
|---|---|---|---|
| 3,275,411 | 9/1966 | Freeman et al. | 23—202 |
| 3,297,411 | 1/1967 | Dear | 23—202 |
| 3,350,171 | 10/1967 | Callow et al. | 23—202 |

OTHER REFERENCES

"The High Intensity Electric Arc and Its Application to Process Chemistry," May 25, 1956, pp. 1, 2, 4–9, 12–14. Published by Vitro Corporation of America and Sheer-Korman Associates, 261 Madison Ave., New York 16, N.Y.

OSCAR R. VERTIZ, *Primary Examiner.*

EDWARD STERN, *Assistant Examiner.*